(12) United States Patent
Van Meter et al.

(10) Patent No.: US 11,291,194 B1
(45) Date of Patent: Apr. 5, 2022

(54) MARINE SPECIMEN CAPTURE SYSTEM

(71) Applicant: ELEFCO, LLC, Hallandale Beach, FL (US)

(72) Inventors: Robert C. Van Meter, Hallandale Beach, FL (US); Peter Schubert, West Jordan, UT (US); Walter G. Fletcher, Roseville, CA (US); Jeffrey J. Conger, Sebastopol, CA (US)

(73) Assignee: Elefco Llc, Fort Laurderdale, FL (US)

( * ) Notice: Subject to any disclaimer, the term of this patent is extended or adjusted under 35 U.S.C. 154(b) by 117 days.

(21) Appl. No.: 16/723,044

(22) Filed: Dec. 20, 2019

Related U.S. Application Data (60) Provisional application No. 62/917,722, filed on Dec. 22, 2018.

(51) Int. Cl.
*A01K 74/00* (2006.01)
*A01K 63/02* (2006.01)
*A01K 69/04* (2006.01)

(52) U.S. Cl.
CPC .............. *A01K 74/00* (2013.01); *A01K 63/02* (2013.01); *A01K 69/04* (2013.01)

(58) Field of Classification Search
CPC ........ A01K 69/00; A01K 69/02; A01K 69/04; A01K 69/06; A01K 79/00
USPC .......................................... 43/100, 101, 104
See application file for complete search history.

(56) References Cited

U.S. PATENT DOCUMENTS

| | | | | |
|---|---|---|---|---|
| 3,184,878 A | * | 5/1965 | Senne | A01K 81/00 43/4 |
| 3,486,264 A | * | 12/1969 | Lombard | A01K 79/00 43/4 |
| 4,239,019 A | * | 12/1980 | Andrews | A01K 79/00 119/201 |
| 4,551,042 A | * | 11/1985 | Hagedorn | B65G 53/30 406/93 |
| 4,894,942 A | * | 1/1990 | Winkler | A01K 79/00 43/4 |
| 9,096,106 B2 | * | 8/2015 | Hanson | B60F 5/00 |
| 9,921,139 B1 | * | 3/2018 | Blouin | G01N 1/14 |

FOREIGN PATENT DOCUMENTS

WO WO-2019070131 A1 * 4/2019 ............... F04F 5/10

* cited by examiner

*Primary Examiner* — Peter M Poon
*Assistant Examiner* — Kari A Bradberry
(74) *Attorney, Agent, or Firm* — John Rizvi; John Rizvi, P.A.—The Patent Professor®

(57) ABSTRACT

A marine specimen capture system for use in capturing a marine specimen alive and intact from an underwater environment includes a specimen capture assembly comprising at least one specimen capture member. The at least one specimen capture member having a capture member inlet and a capture member outlet. A thruster assembly comprising at least one thruster unit is interconnected to the specimen capture assembly. More in particular, the thruster assembly is operative to generate an induced flow along an induced flow path into at least a portion of the at least one specimen capture member through the capture member inlet, wherein the induced flow is sufficient to pull a marine specimen into and through at least the capture member inlet of the at least one specimen capture member.

8 Claims, 10 Drawing Sheets

MARINE SPECIMEN CAPTURE SYSTEM

BACKGROUND OF THE INVENTION

Field of the Invention

A specimen capture system includes a specimen capture assembly configured to allow an operator, whether a diver or a remote vehicle operator, to capture a live marine specimen, such as, by way of example only, invasive species such as lionfish, from an underwater environment, and to retain the marine specimen alive and intact until transfer to an appropriate transfer container for ultimate disposition.

Description of the Related Art

Most persons living in and around the coastal areas of the State of Florida are by now all too familiar with the invasive fish species known as lionfish. Lionfish, which are native to the Indo-Pacific, were first detected along Florida coasts in the mid-1980s, but their populations continue to increase drastically Like many invasive species, lionfish have few natural predators in the warm Florida waters. Lionfish are popular with aquarists, and it is believed possible escapes into the wild via aquarium releases are the cause for the invasion. Lionfish now inhabit reefs, wrecks, and other habitat types in the warm marine waters of the greater Atlantic.

Lionfish continue to expand at astonishing speeds and are harming native coral reef ecosystems in the Atlantic, Gulf of Mexico, and Caribbean. Biologists suspect that lionfish populations have not yet peaked in the Gulf of Mexico, which means that their demand for native prey will continue to increase. Recent research has also revealed that lionfish can tolerate brackish coastal zones, so mangrove and estuarine habitats may also be at risk of invasion.

Adult lionfish are primarily fish-eaters and have very few predators outside of their home range. Researchers have discovered that a single lionfish residing on a coral reef can significantly reduce recruitment of native reef fishes. Because lionfish feed on prey normally consumed by snappers, groupers, and other commercially important native species, their presence is negatively affecting the well-being of valuable commercial and recreational fisheries.

As lionfish populations grow, they put additional stress on coral reefs already struggling from the effects of climate change, pollution, disease, overfishing, sedimentation, and other stressors that have led to the listing of seven coral species in the lionfish-infested area. For example, lionfish eat herbivores and herbivores eat algae from coral reefs. Without herbivores, algal growth goes unchecked, which can be detrimental to the health of coral reefs.

In attempts to combat this problem, lionfish are being presented as a food source, and while the general consensus appears to be that they are highly desirable for human consumption, the present means of capture, which typically involves spear fishing or a trident to capture the lionfish, often damages of destroys the meat, thereby reducing much of the lionfish catch aesthetically unappealing to the mass market.

As such, it would be highly beneficial to provide a system for live capture of marine specimens, such as lionfish, in a manner which leaves the specimen alive and intact until it is ready for transfer and transport for mas marketing purposes. It would be further beneficial to provide such a system which is manageable is size such that it may be maneuvered and operated by a single diver in an underwater marine environment. Yet another advantageous application would be to provide a system for live capture of marine specimens which may be mounted to a remotely operated underwater vehicle which may be used to travel to depths not readily accessible to divers for other than relatively short periods of time, and further, which may be remotely actuated by an operator, either from the surface or from a relatively shallow depth. As one example where remote operation would provide beneficial, lionfish have been reported at considerable depths in the coastal waters off Florida hunting up and down the support structures of offshore oil rigs.

SUMMARY OF THE INVENTION

The present invention, in at least one embodiment, is directed to a marine specimen capture system dimensioned to be handheld by a diver for use in capturing a marine specimen alive and intact from an underwater environment. Alternatively, the present marine specimen capture system is mounted to a remotely operated underwater vehicle.

In at least one embodiment, a marine specimen capture system in accordance with the present invention includes at least one specimen capture assembly having a specimen capture member and a handle affixed thereto to facilitate maneuvering by the diver. IN one further embodiment, a specimen capture member has a capture member inlet, a capture member outlet, and a capture member conduit disposed there between.

The present marine specimen capture system also includes a thruster assembly comprising one or more thruster flow members, wherein each of the thruster flow members is interconnected to a different portion of the specimen capture member. In accordance with at least one further embodiment, a thruster assembly further comprising a plurality of thruster units, wherein each of the plurality of thruster units is mounted to a proximal end of a different one of each of the thruster flow members. Furthermore, each of the plurality of thruster units operative to generate an induced flow along an induced flow path into at least a portion of the specimen capture member through the capture member inlet, wherein the induced flow pulls a marine specimen into and through at least the capture member inlet of the specimen capture member.

In accordance with one further embodiment of the present invention, an actuation assembly is operatively interconnected to the thruster assembly to facilitate selective operation of the plurality of thruster units by the diver.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION

Figure 1:
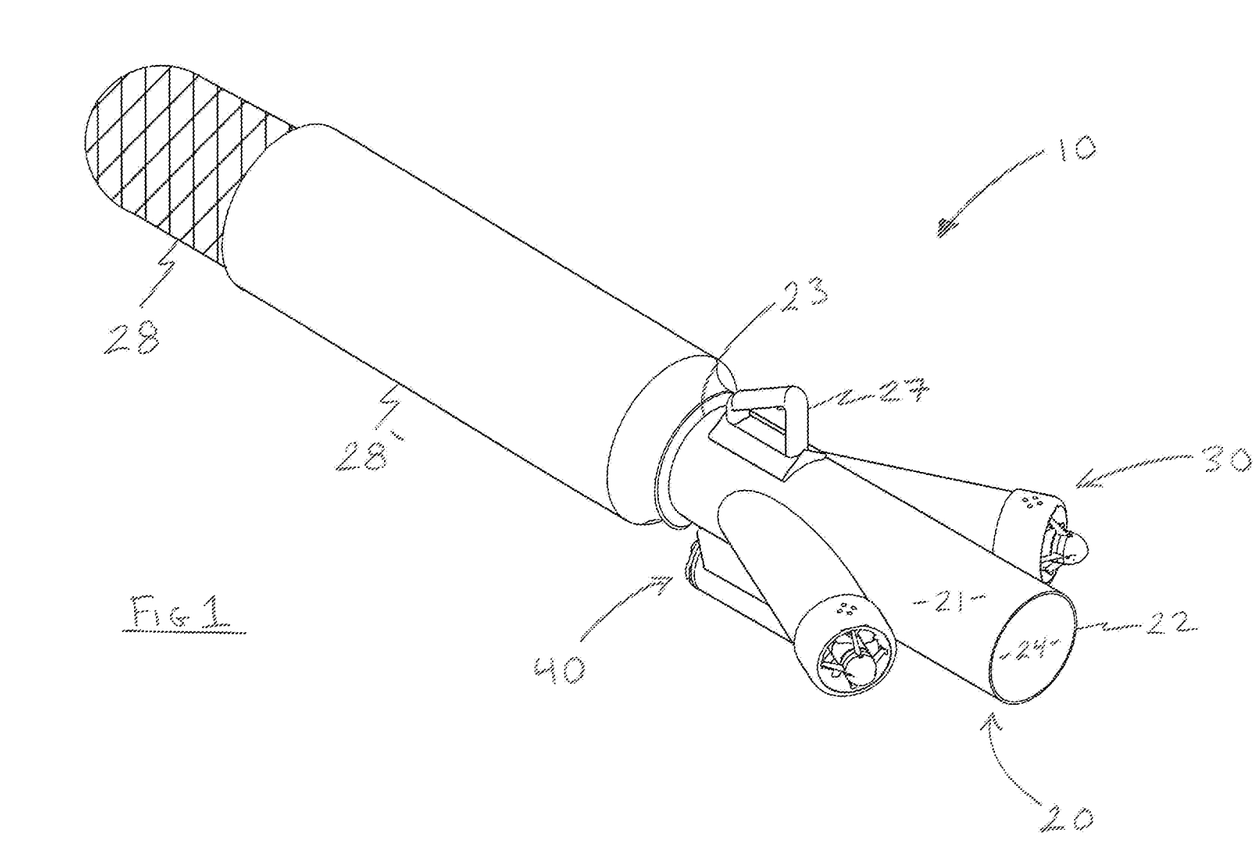
FIG. 1 is a perspective view of one illustrative embodiment of a marine specimen capture system in accordance with the present invention.

As previously stated, the present invention is directed to a marine specimen capture system generally as shown as at 10 throughout the figures. Beginning with reference to the illustrative embodiment of FIG. 1, a marine specimen capture system 10 includes a specimen capture assembly 20. In accordance with at least one embodiment of the present invention, specimen capture assembly 20 includes a handle 29 to facilitate maneuvering of the marine specimen capture system 10 by a diver in an underwater marine environment. As further shown in FIG. 1, a marine specimen capture system 10 in accordance with the present invention further comprises a thruster assembly 30 interconnected to the specimen capture assembly 20. Finally, and with continued reference to the illustrative embodiment of FIG. 1, a marine specimen capture system 10 in accordance with at least one embodiment of the present invention further comprises an actuation assembly 40.

Figure 2:
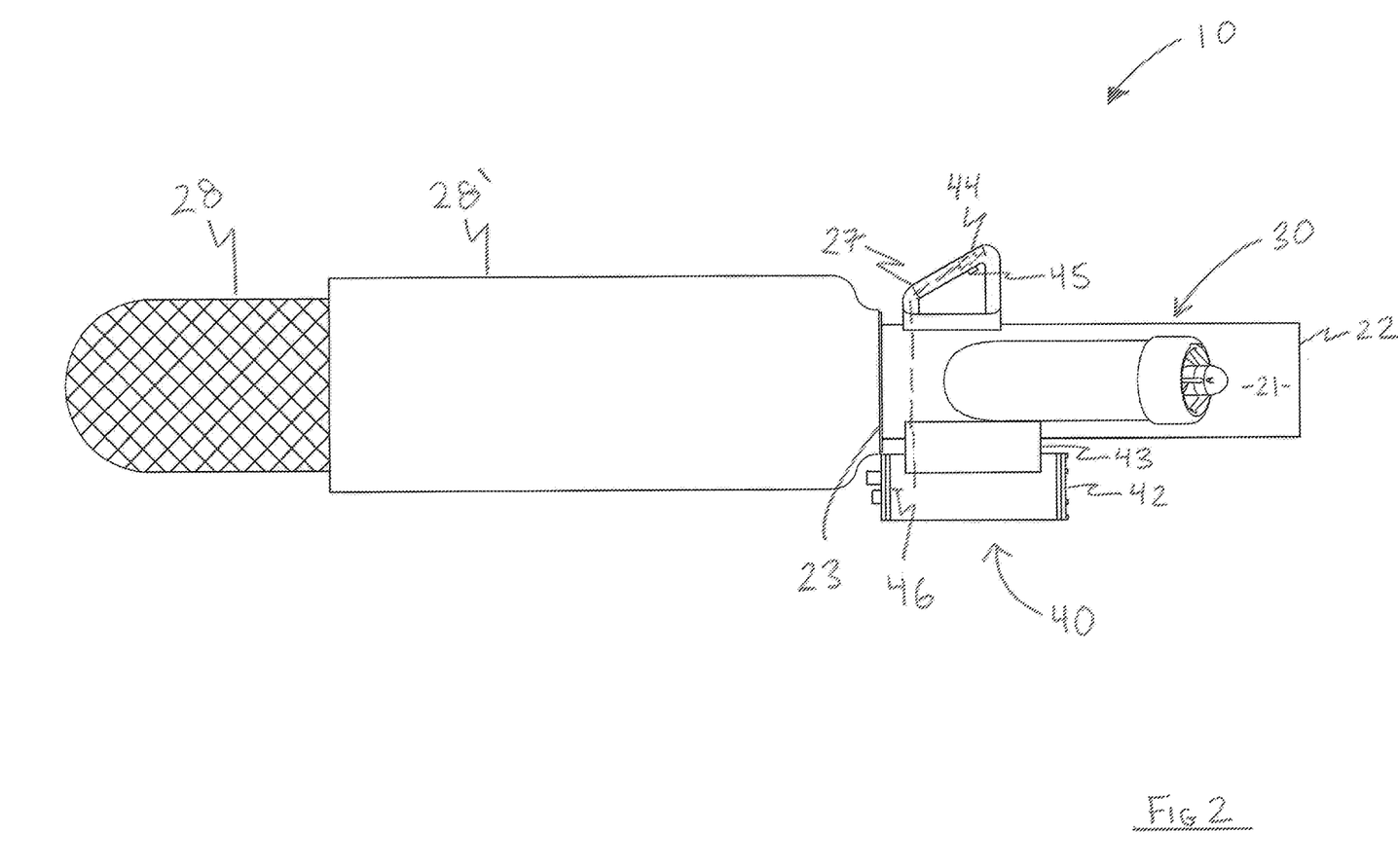
FIG. 2 is a side elevation of the marine specimen capture system of the illustrative embodiment of FIG. 1.

Turning next to the illustrative embodiment of FIG. 2, a specimen capture assembly 20 comprises a specimen capture member 21. More in particular, a specimen capture member 21 in accordance with at least one embodiment of the present invention comprises a capture member inlet 22 and an oppositely disposed capture member outlet 23. With reference once again to the illustrative embodiment of FIG. 1, a capture member conduit 24 is disposed between and is at least partially defined by the capture member inlet 22 and capture member outlet 23 of the specimen capture member 21. In accordance with at least one embodiment of the present marine specimen capture system 10, a capture member inlet 21, and corresponding capture member outlet 22 and capture member conduit 24, each comprise an effective diameter of about two inches to about twelve inches. In at least one further embodiment, a capture member inlet 21, and corresponding capture member outlet 22 and capture member conduit 24, each comprise an effective diameter of about four inches to about eight inches. In at least one embodiment, a capture member inlet 21, and corresponding capture member outlet 22 and capture member conduit 24, each comprise an effective diameter of about five inches to about six inches in diameter so as to be sufficient to permit unobstructed capture of a lionfish alive and intact from an underwater marine environment. Of course, it will be appreciated by those of skill in the art that a capture member inlet 21, and corresponding capture member outlet 22 and capture member conduit 24, may each comprise any of a number of effective diameters depending on the size and type of marine specimen to be captured.

A specimen capture assembly 20 of a marine specimen capture system 10 in accordance with at least one embodiment of the present invention further comprises a captured specimen receptacle 28. Looking once again to the illustrative embodiment of FIG. 1, in at least one embodiment, a captured specimen receptacle 28 comprises an open net like structure wherein captured marine specimens will remain alive and intact until such time as a diver operating the system 10 elects to surface and transfer his or her catch from the captured specimen receptacle 28 to a cooler, transfer tank, etc., for transfer of the captured marine specimens to their final destination, such as, by way of example only, a private aquarium, a pet warehouse, a pet shop, a fish market, a seafood restaurant, etc. As may be seen from FIGS. 1 and 2, in at least one embodiment, a captured specimen receptacle 28 comprises an open net-like configuration. As such, in at least one further embodiment, a captured specimen receptacle 28 is at least partially covered by a receptacle sheath 28', as shown best in the illustrative embodiments of FIGS. 1 and 2. More in particular, a specimen sheath 28' is constructed of a solid material of construction, a closely weaved fabric, or other such material which is structured to prevent sharp fins, spikes, needles, or quills, for example, the poisonous quills of a lionfish, from protruding through the captured specimen receptacle 28 and injuring a diver or other person in the vicinity of the marine specimen capture system 10.

As noted above, a marine specimen capture system 10 in accordance with the present invention comprises a thruster assembly 30 which is interconnected to a specimen capture assembly 20. A thruster assembly 30 comprises at least one thruster unit 32 which is disposed in fluid communication with a capture member conduit 24 of the specimen capture member 21 via at least one thruster flow member 34. In at least one embodiment, a thruster unit 32 is sufficient to generate an induced flow along an induced flow path 38, described in greater detail below, into at least a portion of at least one specimen capture member 21 through a capture member inlet 22. Turning next to the illustrative embodiment of FIG. 3, a thruster assembly 30 in at least one further embodiment of the present invention comprises a plurality of thruster units 32 each disposed in fluid communication with a capture member conduit 24 of the specimen capture member 21 via a corresponding one of a plurality of thruster flow members 34. As before, the plurality of thruster units 32 are sufficient to generate an induced flow along an induced flow path 38 into at least a portion of at least one specimen capture member 21 through a capture member inlet 22. As may be further seen from the illustrative embodiment of FIG. 4, the thruster units 32 of thruster assembly 30 are mounted to corresponding different ones of the plurality of thruster flow members 34 via a corresponding thruster interconnect 33.

Figure 3:
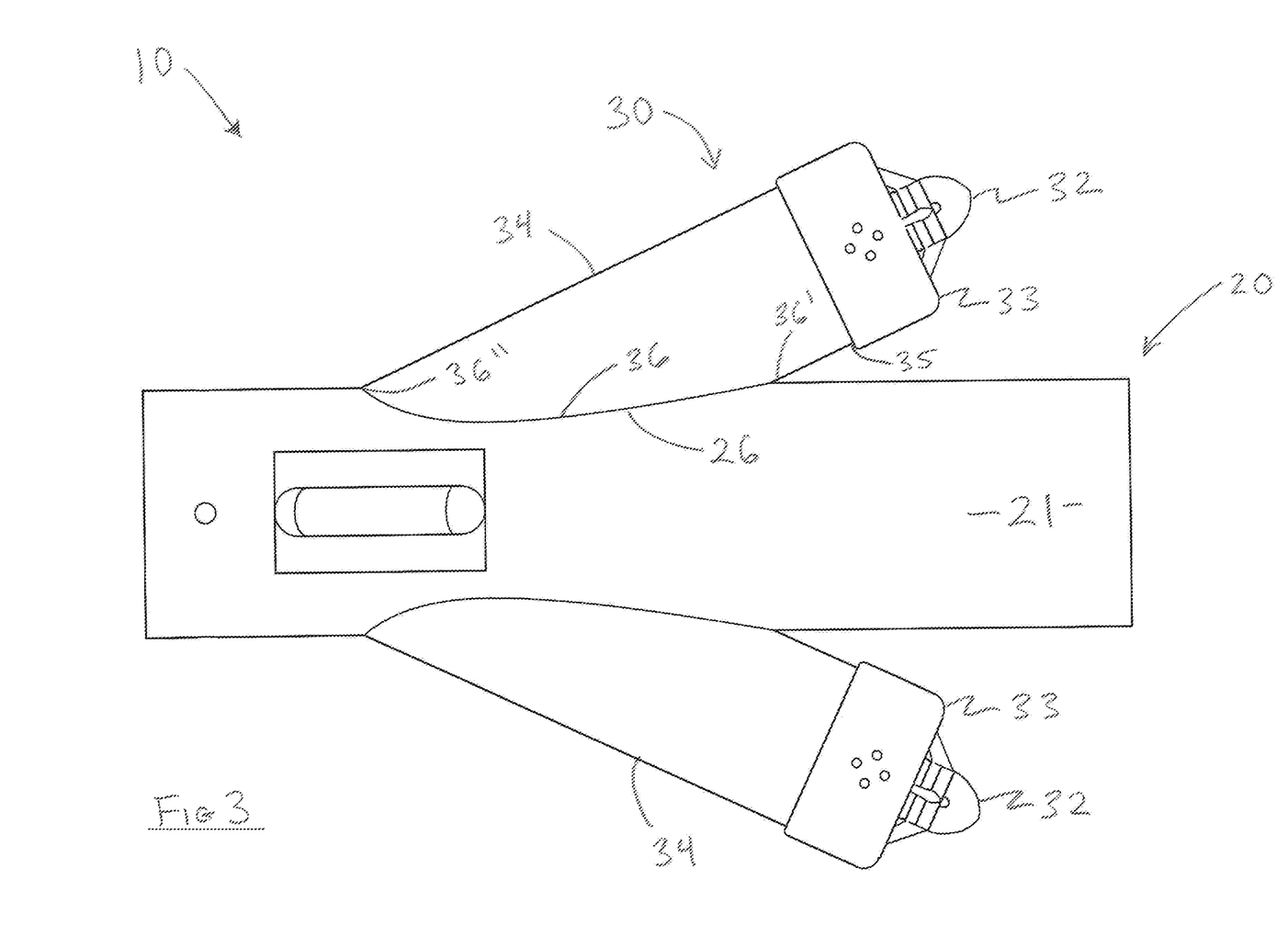
FIG. 3 is a top plan view of the marine specimen capture system of the illustrative embodiment of FIG. 1, shown without a captured specimen receptacle for clarity.

With continued reference to the illustrative embodiment of FIG. 3, a thruster flow member 34 in accordance with the present invention has a proximal end 35 and a distal end 36. As seen in FIG. 3, a thruster unit 32 is operatively disposed over the proximal end 35 of the thruster flow member 34 via thruster interconnect 33. As further shown in FIG. 3, the distal end 36 of the thruster flow member 34 is interconnected to the specimen capture member 21 of the specimen capture assembly 20 along a thruster flow inlet 26 which is formed through a portion of the specimen capture assembly 21. As such, when one or more thruster units 32 are actuated, a thruster flow is drawn in through the thruster units 32 from the surrounding underwater marine environment and into and through thruster flow member 34 along a thruster flow path 38, once again, as described in further detail below. Further, the thruster flow continues along the thruster flow path 38 into the capture member conduit 24 and out through capture member outlet 23. The thruster flow along the thruster flow path 38 into and through the capture member conduit 24 is sufficient to generate an induced flow along an induced flow path 39, also described in greater detail below, wherein the induced flow is sufficient to pull a marine specimen into and through at least the capture member inlet 22 of the specimen capture member 21.

In accordance with at least one embodiment of the present invention, each thruster unit 32 is capable of generating a maximum thruster flow of about 100 gallons per minute to about 600 gallons per minute into and through a corresponding thruster flow member 34, and into and through capture member conduit 24 of a specimen capture member 21. In at least one further embodiment, each thruster unit 32 is capable of generating a maximum thruster flow of about 200 gallons per minute to about 400 gallons per minute into and through a corresponding thruster flow member 34, and into and through capture member conduit 24 of a specimen capture member 21. In yet one further embodiment, each thruster unit 32 is capable of generating a maximum thruster flow of about 200 gallons per minute to about 300 gallons per minute into and through a corresponding thruster flow member 34, and into and through capture member conduit 24 of a specimen capture member 21. As before, it will be appreciated by those of skill in the art that any of a number of thruster units 32 generating any of a wide range of thruster flow volumes per minute may be utilized in accordance with the spirit and intent of the present invention as needed to generate a sufficient induced flow into and through a capture member inlet 22 of a specimen capture member 21, once again, depending on the size and type of marine specimens to be captured utilizing the present marine specimen capture system 10. In at least one embodiment, one or more thruster units 32 have sufficient thrust capacity so as to generate an induced flow sufficient to capture and pull an adult lionfish into and through a capture member inlet 22 of a specimen capture member 21 of the present marine specimen capture system 10. As one example, a thruster unit 32 in accordance with the present invention may comprise a Model T200 Thruster, such as is currently manufactured by Blue Robotics Inc. located in Torrance, Calif., and capable of generating a maximum thruster flow of about 200 gallons per minute to about 240 gallons per minute into and through a corresponding thruster flow member 34, and into and through capture member conduit 24 of a specimen capture member 21.

Returning with reference once again to the illustrative embodiment of FIG. 2, in accordance with at least one embodiment a marine specimen capture system 10 comprises an actuation assembly 40. As shown in FIG. 2, an actuation assembly 40 comprises a power supply 42 which is interconnected to the specimen capture assembly 20 by way of a power supply mount 43. In at least one embodiment, a power supply 42 comprises a battery, which may be a dry cell battery or a rechargeable battery, such as, a lithium ion rechargeable battery. Regardless of the type of battery employed, a power supply 42 accordance with the present invention is enclosed in a waterproof housing or enclosure so as to be suitable for use in an underwater marine environment.

Figure 4:
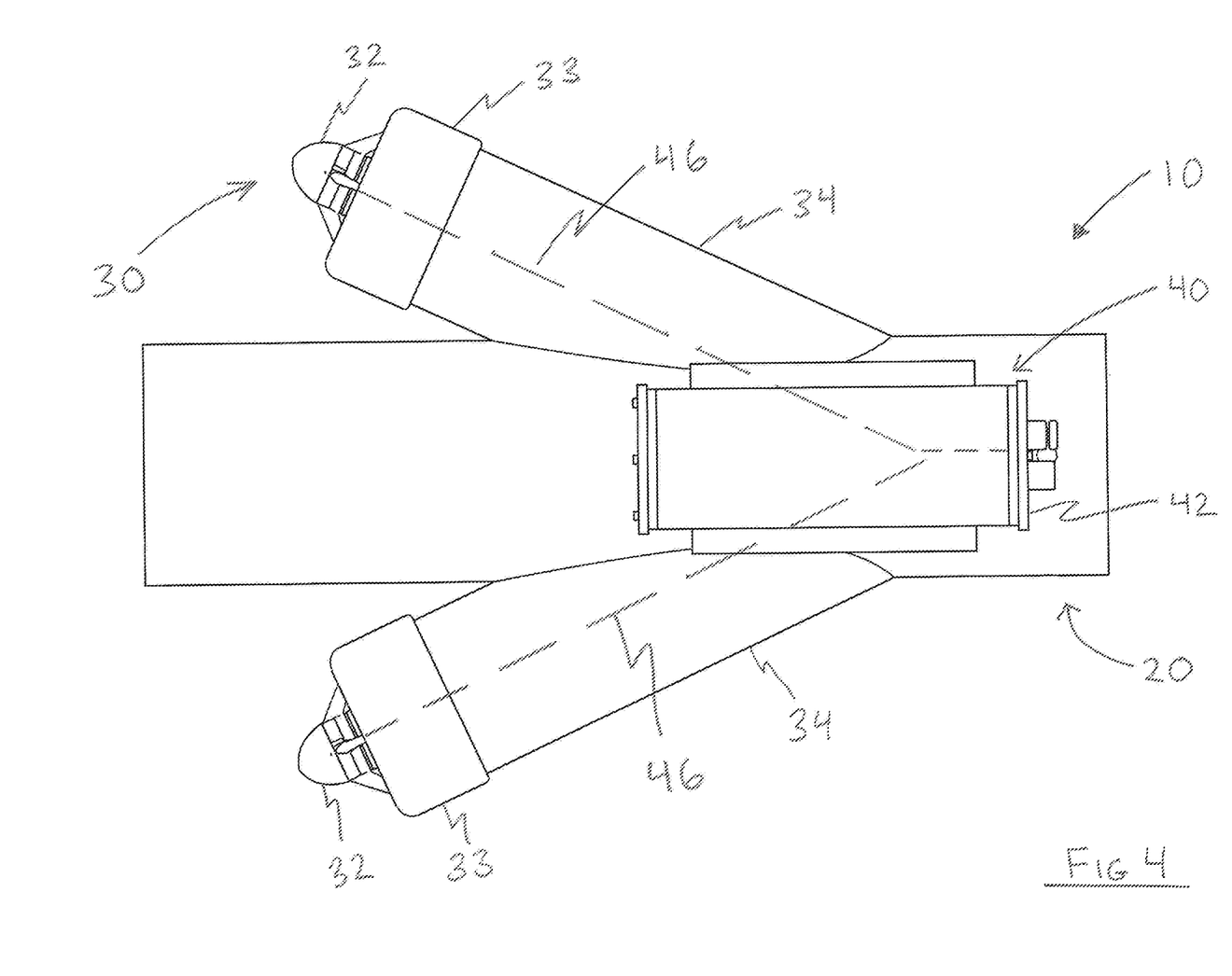
FIG. 4 is a bottom plan view of the marine specimen capture system of the illustrative embodiment of FIG. 1, shown without a captured specimen receptacle for clarity.

With continued reference to the illustrative embodiment of FIG. 2, an actuation assembly 40 further comprises a switching unit 44 which is electrically interconnected to the power supply 42 via an electrical interface 46. In accordance with at least one embodiment, such as is shown in FIG. 2, the switching unit 44 further comprises a switch 45, wherein the switch 45 is operable by a user, such as a diver, so as to actuate one or more of a plurality of thruster units 32 of a thruster assembly 30 to allow capture of one or more marine specimen with the present marine specimen capture system 10. FIG. 4 is illustrative of an electrical interface 46 which electrically interconnects the power supply 42 of the actuation assembly 40, mounted to specimen capture assembly 20, to each of the plurality of thruster units 32 of thruster assembly 30 in accordance with the present invention.

Figure 5:
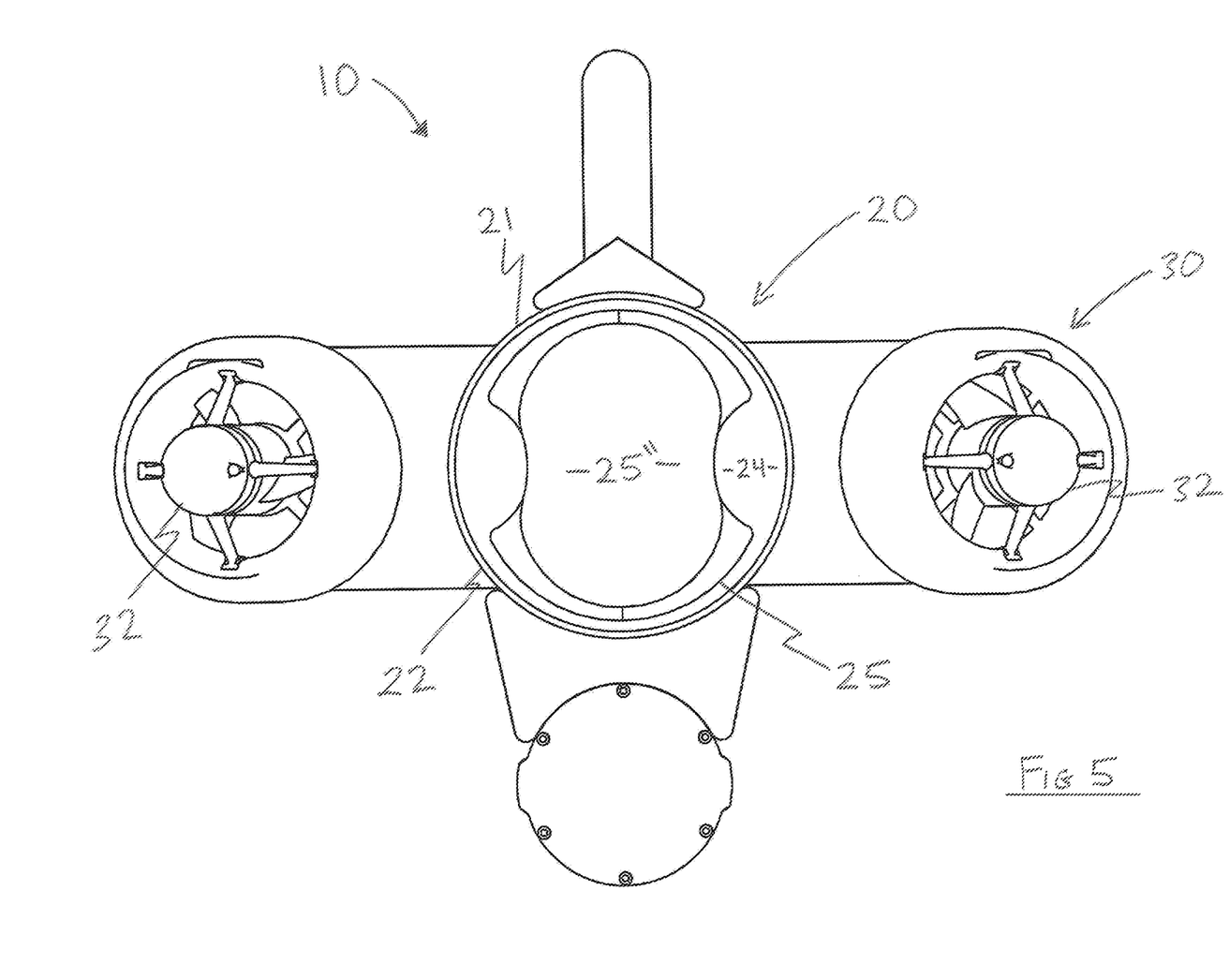
FIG. 5 is a front elevation of the marine specimen capture system of the illustrative embodiment of FIG. 1, shown without a captured specimen receptacle for clarity.

Turning next to the illustrative embodiment of FIG. 5, a front plan view of one embodiment of a marine specimen capture system 10 in accordance with the present invention is shown. As before, the marine specimen capture system 10 comprises a specimen capture assembly 20 having actuation assembly 40 mounted thereto. FIG. 5 further shows a thruster assembly 30 interconnected to specimen capture assembly 20, wherein the thruster assembly 30 comprises a plurality of thruster units 32. The illustrative embodiment of FIG. 5 further shows a deflector 25 operatively disposed within the specimen capture member 21, the deflector 25 having a deflector inlet 25" dimensioned to initially receive a marine specimen, for example, a fish, therein.

Figure 6:
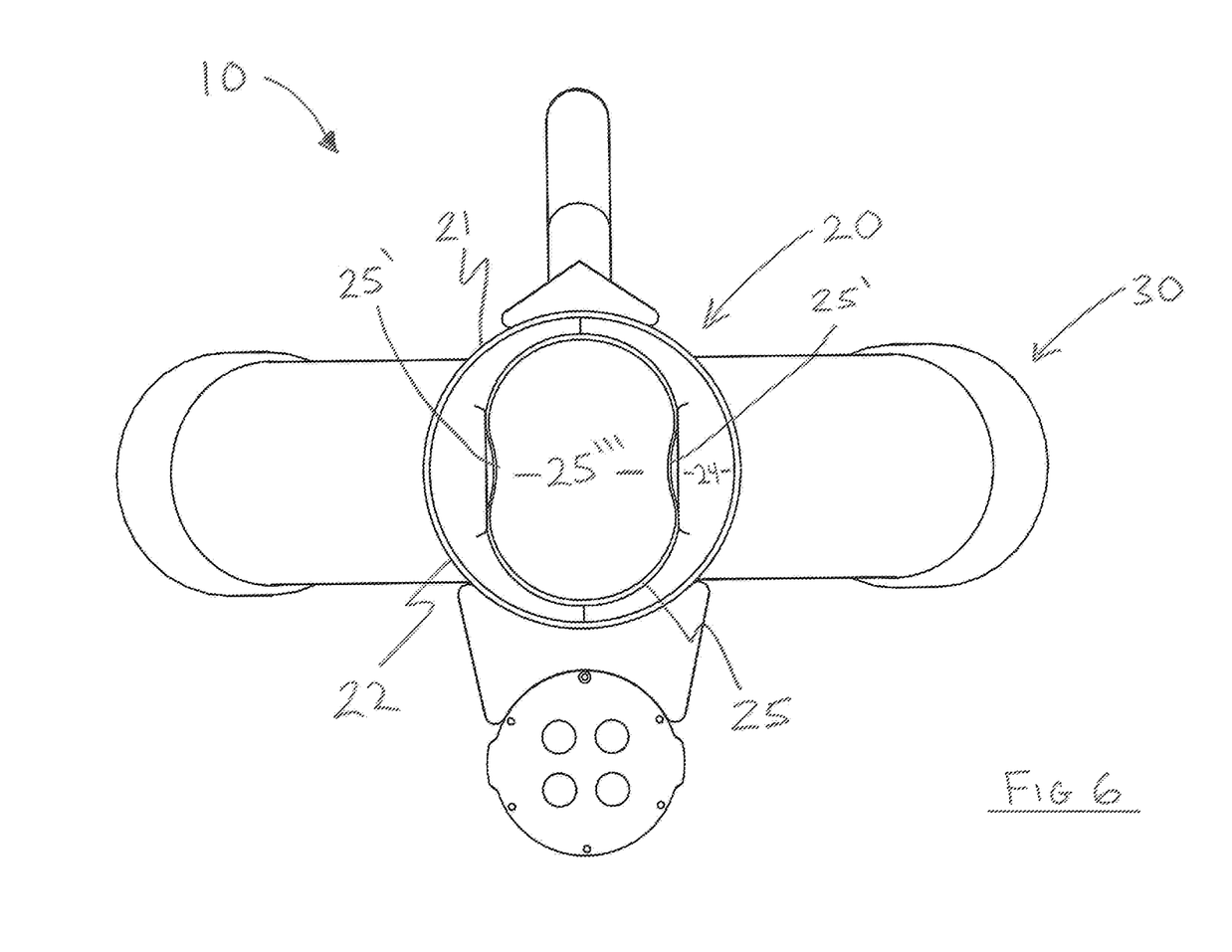
FIG. 6 is a rear elevation of the marine specimen capture system of the illustrative embodiment of FIG. 1, shown without a captured specimen receptacle for clarity.

FIG. 6 presents one illustrative embodiment of a rear elevation of a marine specimen capture system 10 in accordance with the present invention. Once again, the marine specimen capture system 10 comprises a specimen capture assembly 20 having an actuation assembly 40 mounted thereto. The illustrative embodiment of FIG. 6 also shows a deflector 25 operatively disposed within the specimen capture member 21 which has a deflector outlet 25'" dimensioned to allow a marine specimen, for example, a fish, to pass there through. FIG. 6 further illustrates a thruster flow interface 25' along each side of deflector 25 which facilitates the transition of the thruster flow along thruster flow path 38 through the thruster flow member 24 and into the specimen capture member 21 as shown better with reference to the illustrative embodiment of FIG. 7.

Figure 7:
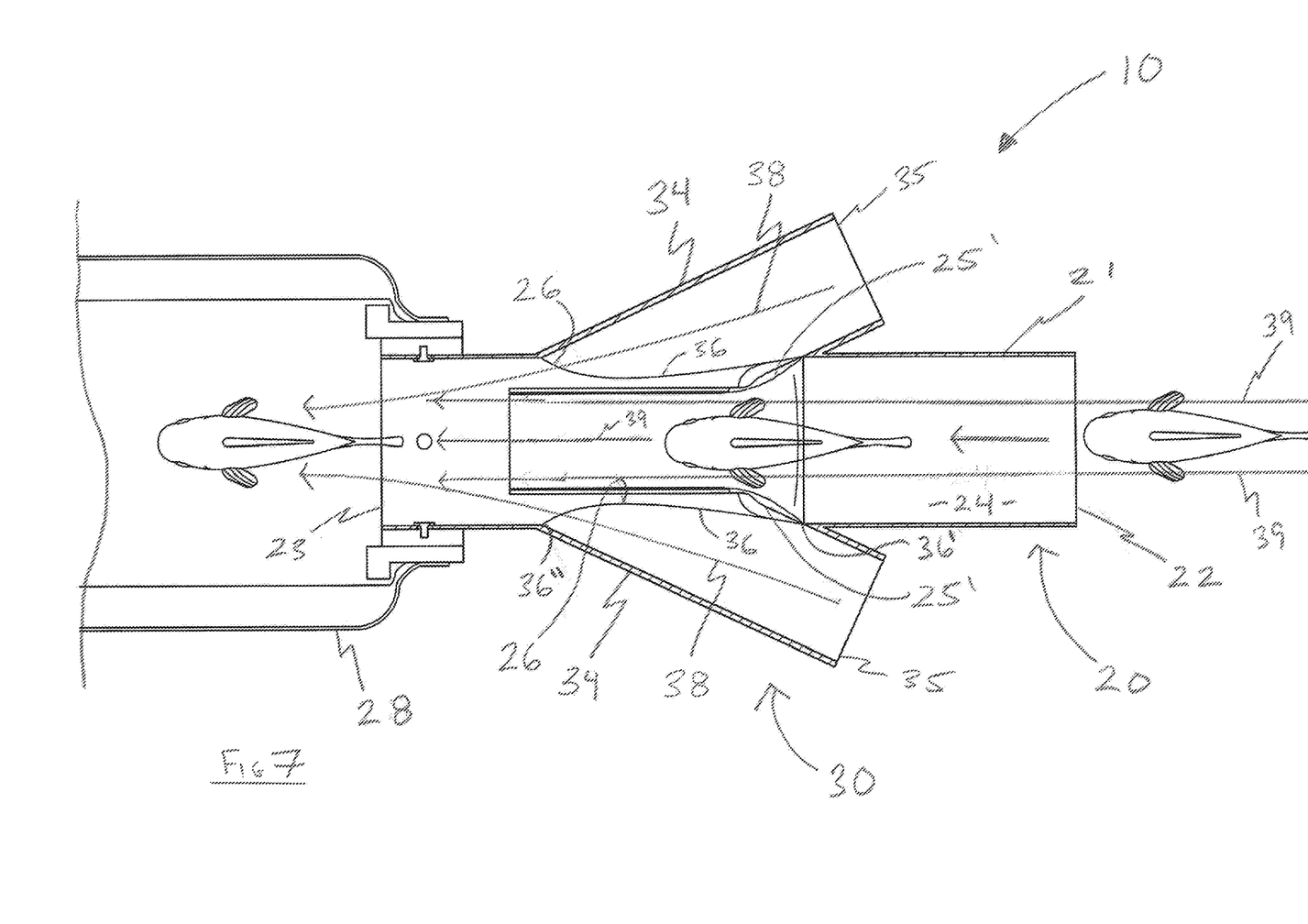
FIG. 7 is a partial cutaway view of an illustrative embodiment of a marine specimen capture system showing thruster flow paths and an induced flow path there through pulling a marine specimen in and through the specimen capture assembly.

More in particular, the illustrative embodiment of FIG. 7 presents one embodiment of a flow regime into and through a specimen capture assembly 20 of a marine specimen capture system 10 in accordance with the present invention. To begin, upon actuation of one or more thruster units 32 (not shown for purposes of clarity), fluid is pulled into and through a corresponding one of said plurality of thruster flow members 34 along a corresponding thruster flow path 38, as shown in the illustrative embodiment of FIG. 7. The force of the thruster flow along the thruster flow path 38 is sufficient to create an induced flow along an induced flow path 39 into and through the capture member inlet 22, via a venturi like effect. The induced flow continues on along the induced flow path 39 through the capture member conduit 24 of the specimen capture member 21, wherein the thruster flow along the thrust flow path 38 and the induced flow along the induced flow path 39 ultimately merge into one another, as also shown in the illustrative embodiment of FIG. 7. As further seen from the illustrated embodiment of FIG. 7, a marine specimen, such as, by way of example, a fish, is pulled into and along with the induced flow along the induced flow path 39 into and through the capture member inlet 22, into and through the capture member conduit 24 of the specimen capture unit 21, and into the captured specimen receptacle 28. As may also be seen from the illustrative embodiment of FIG. 7, the induced flow path 39 into and through the specimen capture member 21 into the captured specimen receptacle 28 is essentially unobstructed, such that the marine specimen is captured alive and intact without physical trauma or damage.

Looking further to the illustrative embodiment of FIG. 7, each of the plurality of thruster flow members 34 has a proximal end 35 and a distal end 36, wherein each distal end 36 in operatively interconnected to a corresponding different one of a plurality of thruster flow inlets 26 through and into the specimen capture member 21. As further shown in FIG. 7, the distal end 36 of the thruster flow member 34 comprises a leading edge 36' and a trailing edge 36". The deflector 25 which is operatively positioned in the capture member conduit 24 of the specimen capture member 21 comprises a plurality of thruster flow interface surfaces 25', wherein each thruster flow interface surface 25' is dimensioned and disposed to align with a leading edge 36' of a corresponding one of the plurality of thruster flow members 34. More in particular, each thruster flow interface surface 25' comprises a generally concave configuration, relative to the thruster flow along the thruster flow path 38, so as to provide a smooth transition of the thruster flow along the thruster flow path 38 from the thruster flow member 34 into the capture member conduit 24 of the specimen capture member 21. This smooth transition assures a smooth and steady induced flow along the induced flow path 39, to further assure a marine specimen is captured alive and intact utilizing the present marine specimen capture system 10.

Figure 8:
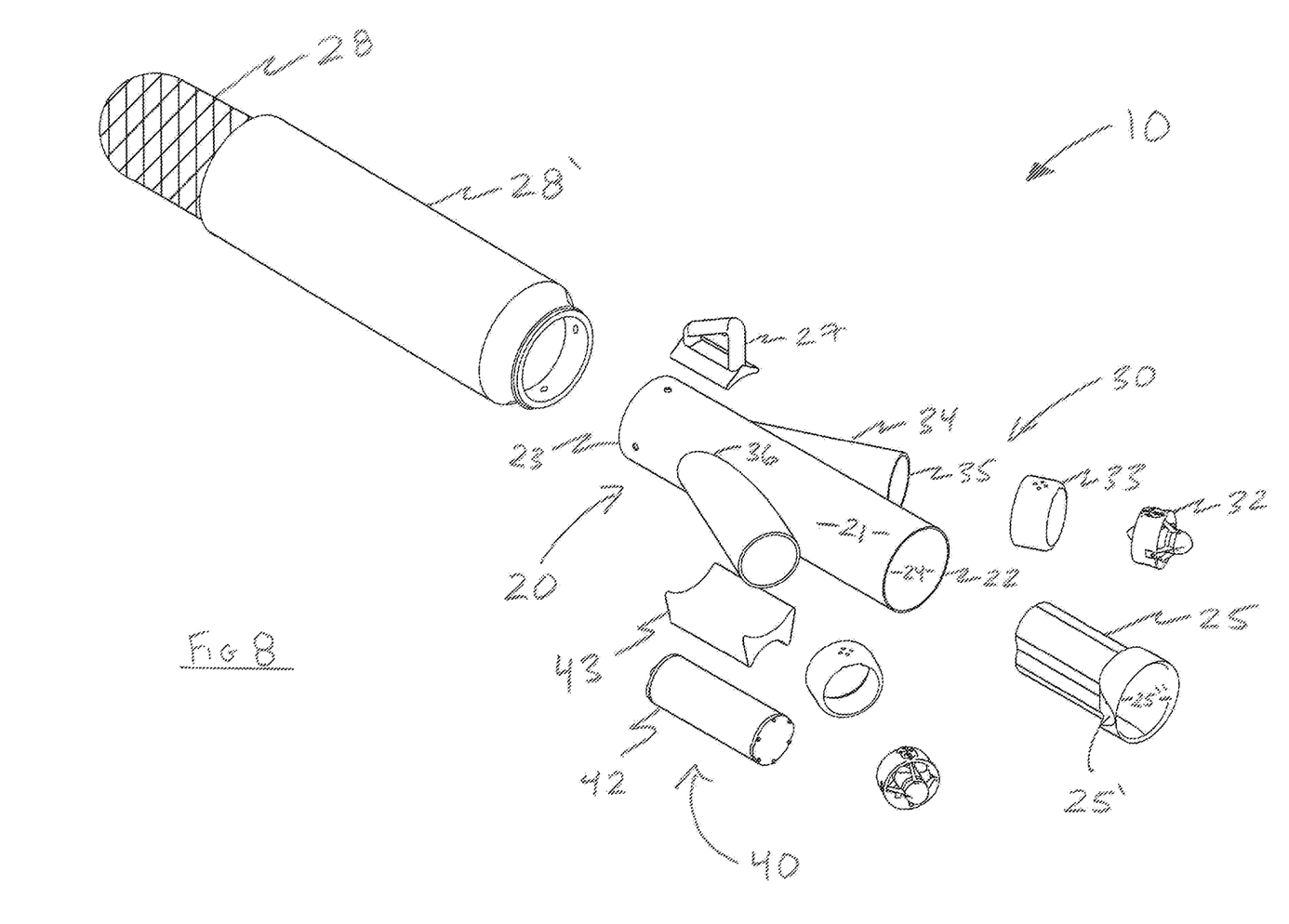
FIG. 8 is an exploded perspective view of one illustrative embodiment of a marine specimen capture system in accordance with the present invention.

FIG. 8 presents an exploded perspective view of one illustrative embodiment of a marine specimen capture system 10 in accordance with the present invention. As before, the system 10 includes a specimen capture assembly 20 having at least one specimen capture member 21. The at least one specimen capture member 21 has a capture member inlet 22, a capture member outlet 23, and a capture member conduit 24 formed and at least partially defined there between. A defector 25 is provided and is operatively positionable within the capture member conduit 24 of the specimen capture member 21. As shown in FIG. 8, the deflector has at least one thruster flow interface 25' formed thereon which, as noted above with reference to the illustrative embodiment of FIG. 7, is dimensioned and disposed to align with a leading edge 36' of a corresponding one of the plurality of thruster flow members 34 so as to provide a smooth is dimensioned and disposed to align with a leading edge 36' of a corresponding one of the plurality of thruster flow members 34. Also as before, the specimen capture assembly 20 comprises a captured specimen receptacle 28 which is removably but securely attached to the distal end 23 of the specimen capture member 21 in accordance with at least one embodiment of the present invention. A handle 27 is provided to facilitate maneuverability of the marine specimen capture system 10 by a diver in an underwater marine environment. As previously indicated, a receptacle sheath 28' may be provided in an at least partially surrounding relation to the captured specimen receptacle 28 to protect a diver or those in close proximity to the present marine specimen capture system 10 from spiked fins, needles, quills, etc., of the captured marine specimens therein.

As may be further seen from FIG. 8, the marine specimen capture system 10 comprises a thruster assembly 30 interconnected to the specimen capture assembly 20. The thruster assembly comprises one or more thruster units 32 each mounted to a corresponding one of a plurality of thruster flow members 34, each accordingly interconnected at distal end 36 thereof to a specimen capture member 21. In at least one embodiment, a thruster interconnect 33 is provided to facilitate mounting a thruster unit 32 to a proximal end 35 of a corresponding thruster flow member 34.

The illustrative embodiment of FIG. 8 further shows an actuation assembly 40 for the present marine specimen capture system 10. More in particular, an actuation assembly 40 comprises a power supply 42. As before, the power supply 42 is enclosed or encased in a waterproof enclosure for operation thereof in an underwater marine environment. The power supply 42 is mounted to the specimen capture assembly 20 via power supply mount 43.

Figure 9:
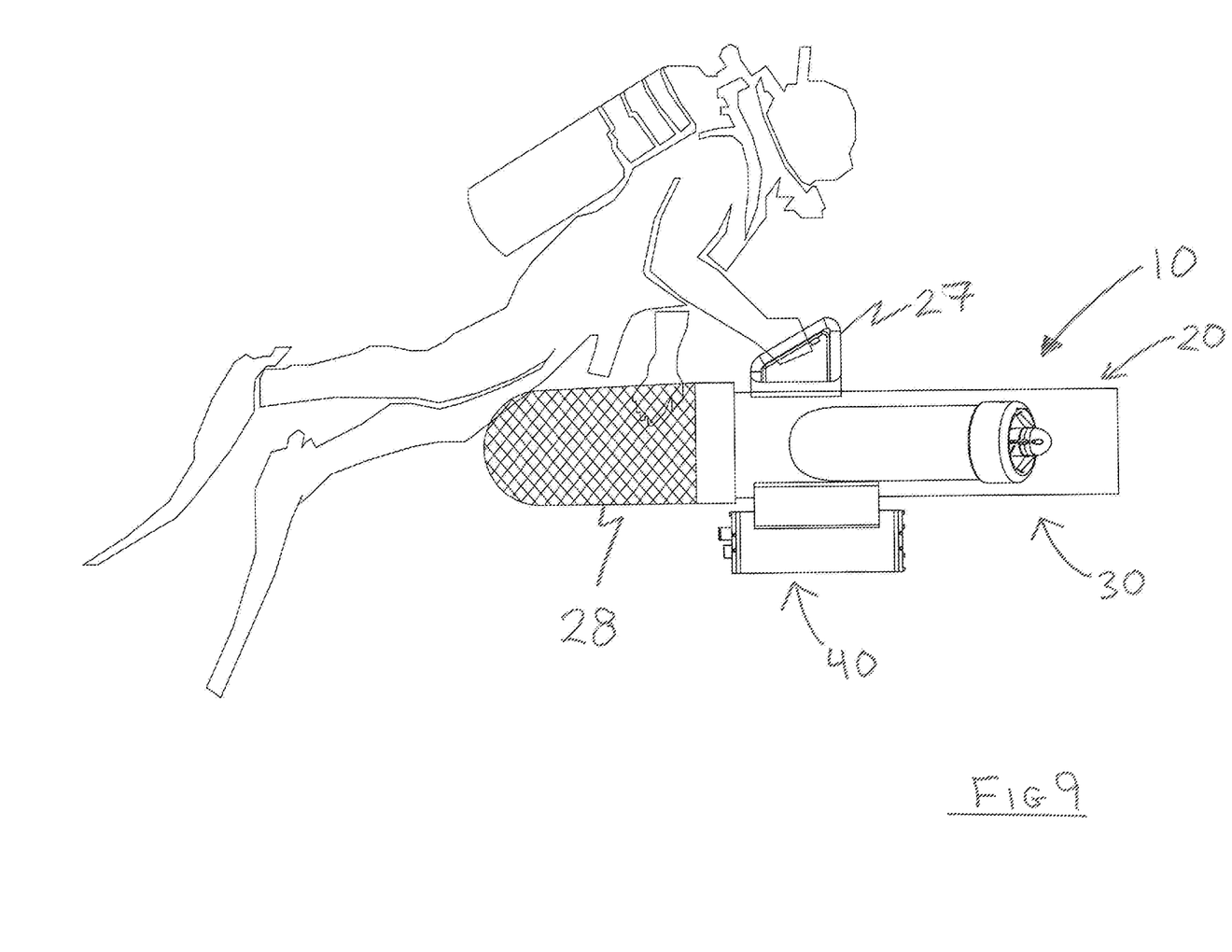
FIG. 9 is a perspective view of one illustrative embodiment of a marine specimen capture system in accordance with the present invention being maneuvered by a diver in an underwater marine environment.

FIG. 9 is a perspective view of one illustrative embodiment of a marine specimen capture system 10 in accordance with the present invention being maneuvered by a diver in an underwater marine environment. As may be seen from FIG. 9, the marine specimen capture system 10 includes a specimen capture assembly 20 having a handle 27 to facilitate maneuverability of the system 10 by the diver in an underwater marine environment. As before, the specimen capture assembly 20 includes a captured specimen receptacle 28 removably secured to a distal end thereof such that captured marine specimens will remain alive and intact until such time as the diver elects to surface and transfer his or her catch from the captured specimen receptacle 28 to a cooler, transfer tank, etc., for transfer of the captured marine specimens to their final destination, such as, once again, by way of example only, a private aquarium, a pet warehouse, a pet shop, a fish market, a seafood restaurant, etc. Also as before, the marine specimen capture system 10 as shown in the illustrative embodiment of FIG. 9 includes a thruster assembly 30 operatively interconnected to the specimen capture assembly 20, and an actuation assembly 40 to permit selective actuation of the thruster assembly 30 by the diver.

Figure 10:
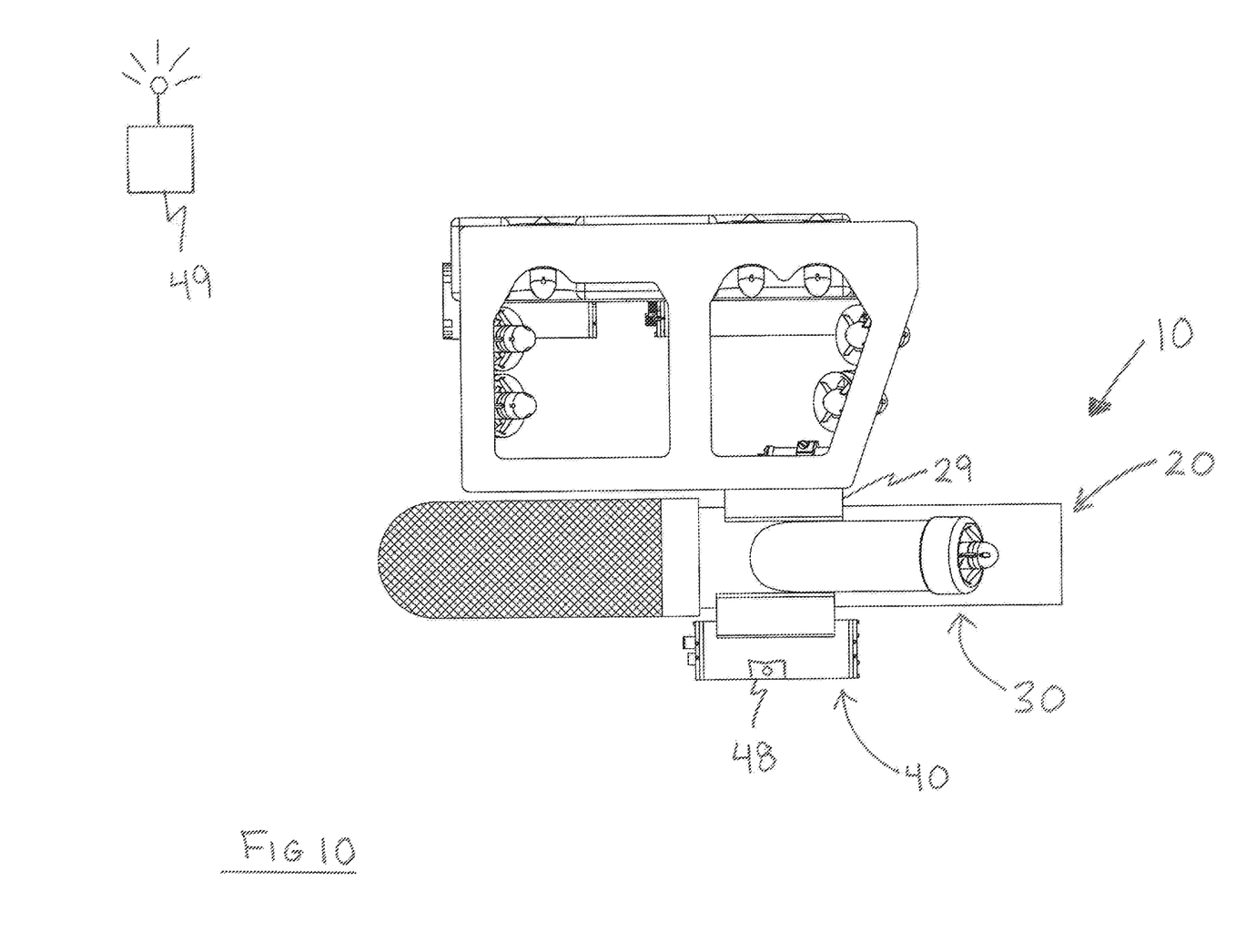
FIG. 10 is a perspective view of one illustrative embodiment of a marine specimen capture system in accordance with the present invention mounted to a remotely operated underwater vehicle in accordance with the present invention.

FIG. 10 is a perspective view of one illustrative embodiment of a marine specimen capture system 10 in accordance with the present invention mounted to a remotely operated underwater vehicle in accordance with the present invention. Once again, the marine specimen capture system 10 includes a specimen capture assembly 20 having a thruster assembly 30 operatively interconnected thereto. As may be seen in the illustrative embodiment of FIG. 10, the specimen capture assembly 20 includes a remote vehicle mount 29 to facilitate mounting the present marine specimen capture system 10 to the remotely operated underwater vehicle. Once again, as before, the marine specimen capture system 10 includes a thruster assembly 30 operatively interconnected to the specimen capture assembly 20, and an actuation assembly 40 to permit selective remote actuation of the thruster assembly 30. To facilitate selective remote actuation of the thruster assembly 30, the actuation assembly 40 further comprises a remote receiver 48 operably interconnected thereto, and a remote transmitter 49 disposed in a communicative relationship with the remote receiver 48 so as to allow an operator to selectively actuate the thruster assembly 30 from a location remote of the marine specimen capture system 10, such as, by way of example, either from the surface or from a relatively shallow depth. As will be appreciated by those of skill in the art, the communicative relationship between the remote transmitter 49 and the remote receiver 48 may be established via a physical hard wired connection or it may be established via a wireless connection.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A marine specimen capture system dimensioned to be handheld by a diver for use in capturing a marine specimen alive and intact from an underwater environment, said system comprising:
   a specimen capture assembly having a specimen capture member and a handle affixed thereto to facilitate maneuvering by the diver,
   said specimen capture member having a capture member inlet, a capture member outlet, and a capture member conduit disposed there between,
   a thruster assembly comprising a plurality of thruster flow members, each of said plurality of thruster flow members interconnected to a different portion of said specimen capture member,
   said thruster assembly further comprising a plurality of thruster units, each of said plurality of thruster units mounted to a proximal end of a different one of each of said plurality of thruster flow members,
   said plurality of thruster units operative to generate a thruster flow along a thruster flow path into at least a portion of said specimen capture member through said capture member inlet,
   said thruster flow pulls the marine specimen into and through at least said capture member inlet of said specimen capture member,
   an actuation assembly operatively interconnected to said thruster assembly to facilitate selective operation of said plurality of thruster units by the diver,
   each of said plurality of thruster flow members is interconnected to said specimen capture member via a different one of a plurality of thruster flow inlets formed through said specimen capture member,
   said specimen capture assembly further comprises a deflector, said deflector mounted in said capture member conduit proximate said plurality of thruster flow inlets formed through said specimen capture member, and
   said deflector comprises at least one flow interface positioned to facilitate a transition of said thruster flow from at least one of said plurality of thruster flow members into said capture member conduit, wherein said at least one flow interface comprises an at least partially concave configuration dimensioned to align with a leading edge of a distal end of at least one of said plurality of thruster flow members and to extend into said capture member conduit to facilitate said transition of said thruster flow from at least one of said plurality of thruster flow members into said capture member conduit.

2. A marine specimen capture system dimensioned to be handheld by a diver for use in capturing a marine specimen alive and intact from an underwater environment, said system comprising:
   a specimen capture assembly having a specimen capture member and a handle affixed thereto to facilitate maneuvering by the diver,
   said specimen capture member having a capture member inlet, a capture member outlet, and a capture member conduit disposed there between,
   a thruster assembly comprising a plurality of thruster flow members, each of said plurality of thruster flow members interconnected to a different portion of said specimen capture member,
   said thruster assembly further comprising a plurality of thruster units, each of said plurality of thruster units mounted to a proximal end of a different one of each of said plurality of thruster flow members,
   said plurality of thruster units operative to generate a thruster flow along a thruster flow path into at least a portion of said specimen capture member through said capture member inlet,
   said thruster flow pulls the marine specimen into and through at least said capture member inlet of said specimen capture member,
   an actuation assembly operatively interconnected to said thruster assembly to facilitate selective operation of said plurality of thruster units by the diver,
   each of said plurality of thruster flow members is interconnected to said specimen capture member via a different one of a plurality of thruster flow inlets formed through said specimen capture member,
   said specimen capture assembly further comprises a deflector, said deflector mounted in said capture member conduit proximate said plurality of thruster flow inlets formed through said specimen capture member, and
   said deflector comprises a plurality of flow interfaces, each of said plurality of flow interfaces positioned to facilitate a transition of said thruster flow from a different one of each of said plurality of thruster flow members into said capture member conduit, wherein each of said plurality of flow interfaces comprises an at least partially concave configuration dimensioned to align with a leading edge of a distal end of a different one of each of said plurality thruster flow members and to extend into said capture member conduit to facilitate said transition of said thruster flow from said plurality of thruster flow members into said capture member conduit.

3. The marine specimen capture system as recited in claim 1 wherein said actuation assembly comprises a power supply and a switching unit, said power supply electrically interconnected to each of said plurality of thruster units through said switching unit via an electrical interface.

4. The marine specimen capture system as recited in claim 3 wherein said handle comprises a switch operative with said switching unit to allow the diver to selectively operate one or more of said plurality of thruster units.

5. A marine specimen capture system mounted to a remotely operated underwater vehicle for use in capturing a marine specimen alive and intact frons an underwater environment, said system comprising:
   a specimen capture assembly having a specimen capture member,
   said specimen capture member having a capture member inlet, a capture member outlet, and a capture member conduit disposed there between,
   a thruster assembly comprising a plurality of thruster flow members, each of said plurality of thruster flow members interconnected to a different portion of said specimen capture member,
   said thruster assembly further comprising a plurality of thruster units, each of said plurality of thruster units mounted to a proximal end of a different one of each of said plurality of thruster flow members, said plurality of thruster units operative to generate a thruster flow along a thruster flow path into at least a portion of said capture member through said capture member inlet, said thruster flow pulls the marine specimen into and through at least said capture member inlet of said specimen capture member, an actuation assembly interconnected to said thruster assembly to facilitate selective remote actuation of said plurality of thruster units, each of said plurality of thruster flow members is interconnected to said specimen capture member via a different one of a plurality of thruster flow inlets formed through said specimen capture member, said specimen capture assembly further comprises a deflector, said deflector mounted in said capture member conduit proximate said plurality of thruster flow inlets formed through said specimen capture member, and said deflector comprises at least one flow interface positioned to facilitate a transition of said thruster flow from at least one of said plurality of thruster flow members into said capture member conduit, wherein said at least one flow interface comprises an at least partially concave configuration dimensioned to align with a leading edge of a distal end of at least one of said plurality of thruster flow members and to extend into said capture member conduit to facilitate said transition of said thruster flow from at least one of said plurality of thruster flow members into said capture member conduit.

6. The marine specimen capture system as recited in claim 5 further comprising a mount assembly to operatively interconnect said marine specimen capture system.

7. The marine specimen capture system as recited in claim 5 wherein said actuation assembly further comprises a remote receiver disposed in an operative engagement therewith.

8. The marine specimen capture system as recited in claim 7 further comprising a remote transmitter, wherein said remote transmitter is remotely communicative with said remote receiver to allow selective remote actuation of one or more of said plurality of thruster units.

* * * * *